United States Patent
Anderson

[15] 3,654,829
[45] Apr. 11, 1972

[54] APPARATUS FOR PUNCHING HOLES IN HEAT SHRINKABLE WEB MATERIAL

[72] Inventor: Andrew W. Anderson, West Caldwell, N.J.
[73] Assignee: Scandia Packaging Machinery Company, North Arlington, N.J.
[22] Filed: July 29, 1969
[21] Appl. No.: 845,841

[52] U.S. Cl. ..................... 83/78, 264/156, 83/171, 425/290, 425/216, 83/660
[51] Int. Cl. ....................................... B29c 17/08
[58] Field of Search .................. 18/19 R, 19 P, 2 J, DIG. 37, 18/DIG. 60; 264/156; 83/30

[56] References Cited

UNITED STATES PATENTS

| 1,184,259 | 5/1916 | Price | 18/DIG. 60 |
| 2,275,612 | 3/1942 | Chandler | 18/DIG. 37 |
| 3,059,304 | 10/1962 | Renkert et al. | 18/DIG. 37 |
| 3,092,439 | 6/1963 | Harrison | 264/156 X |
| 3,503,097 | 3/1970 | Krupp | 264/156 X |

Primary Examiner—J. Spencer Overholser
Assistant Examiner—Lucius R. Frye
Attorney—Luther W. Hawley and Markva, Smith & Kruger

[57] ABSTRACT

A method and apparatus for punching holes in a web of material used in wrapping packages is provided. The web of material has a composition that will change shape when subjected to heat. Heated punches are used to form holes in the web of material and the heat from the punch affects the material along the periphery of the hole to form a thickened ridge therearound. The ribbed edges are reinforcements which prevent tearing of the material used in the wrapping process. The apparatus includes feed means for the web of material to move between a base support and at least one punch member. A more specific feature of the invention includes the use of a vacuum forming means to remove punchings from the apparatus when they are obtained from the web of material. Wrapping material that is adaptable to the method and apparatus of this invention includes compositions such as polypropylene.

8 Claims, 13 Drawing Figures

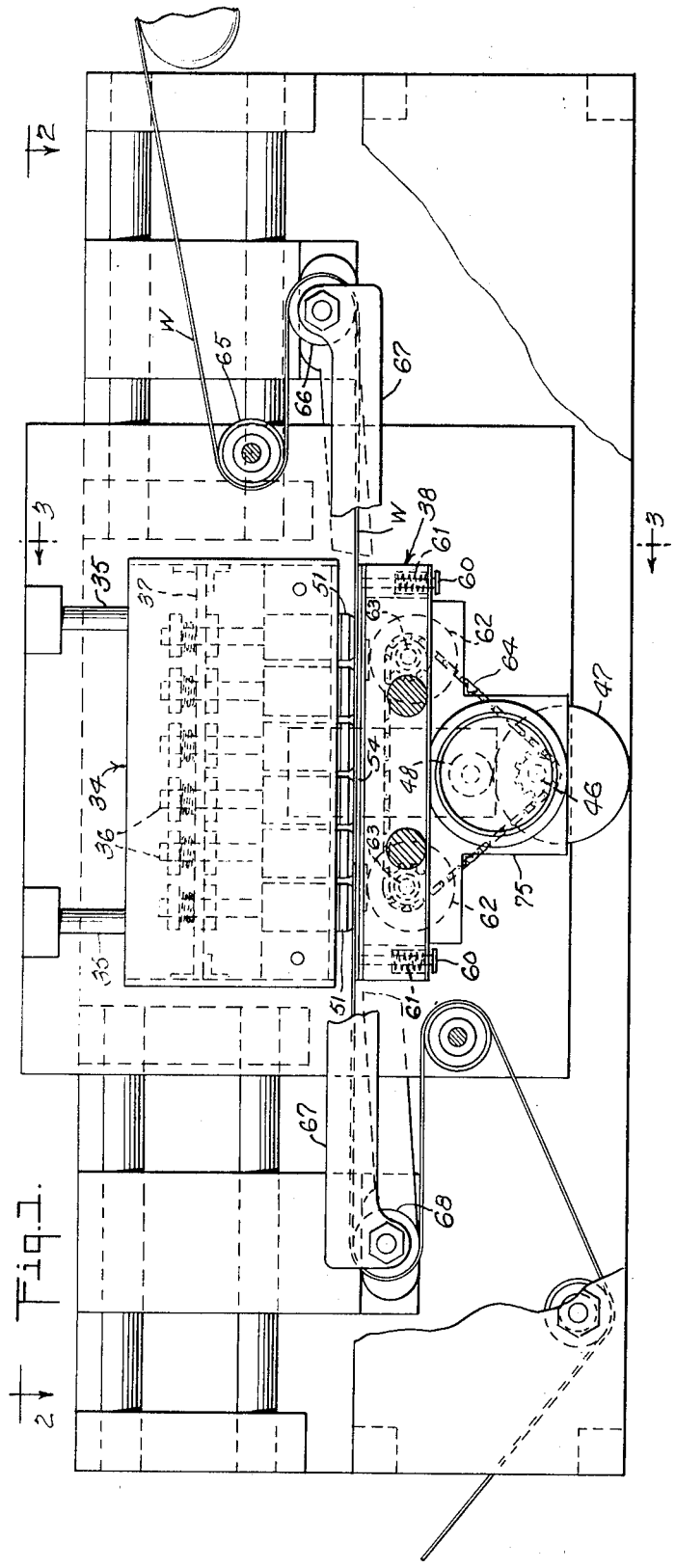
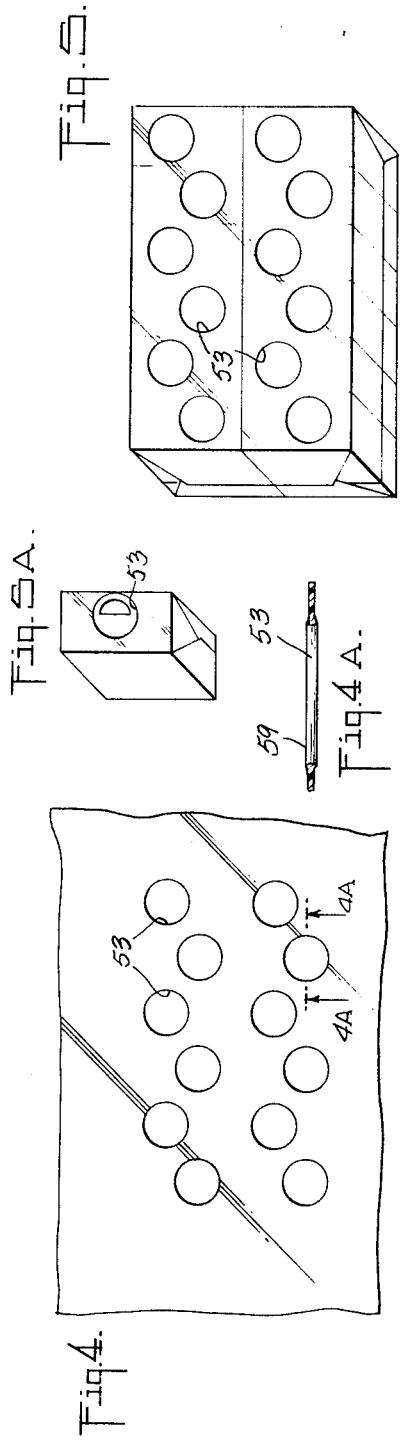

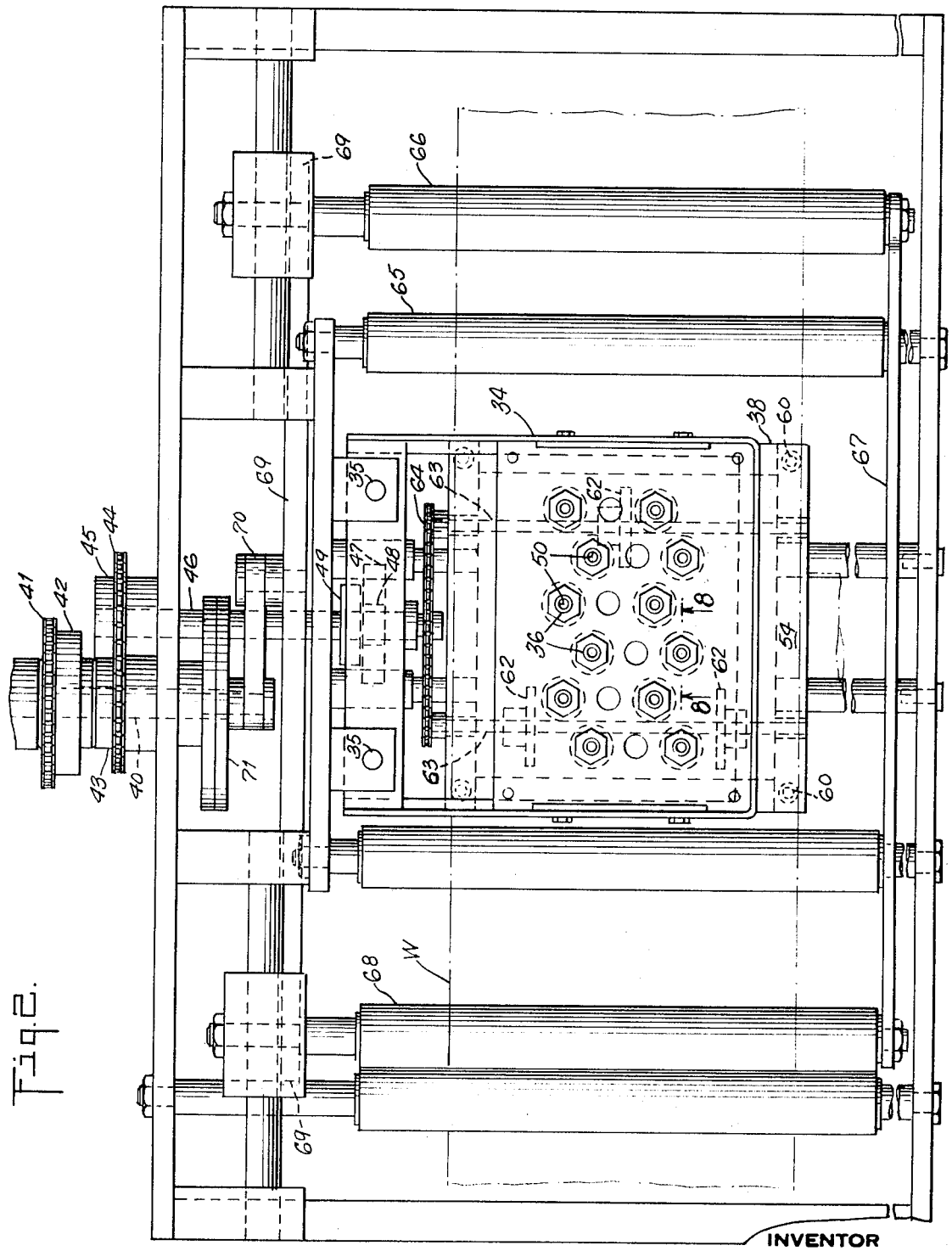

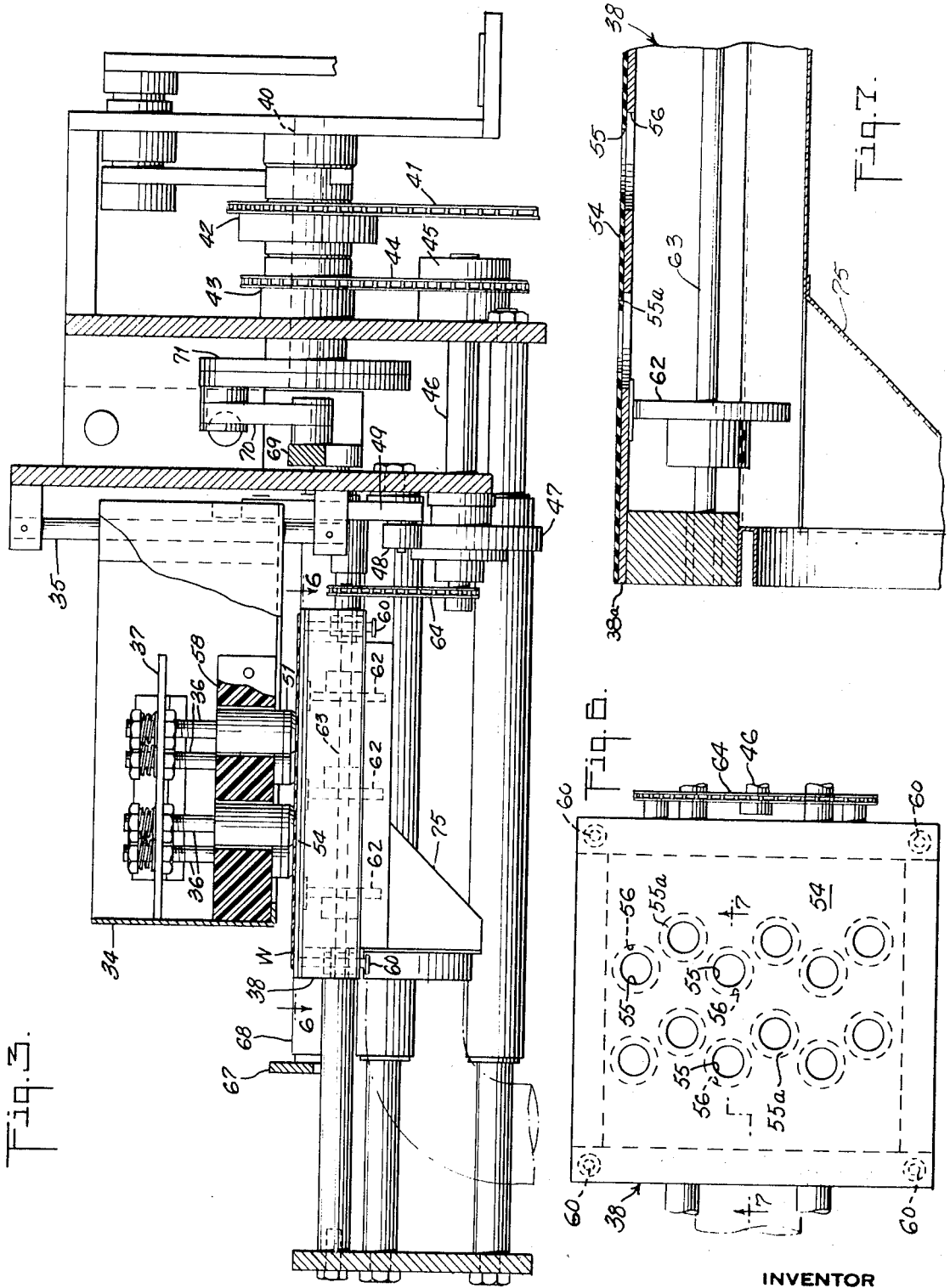

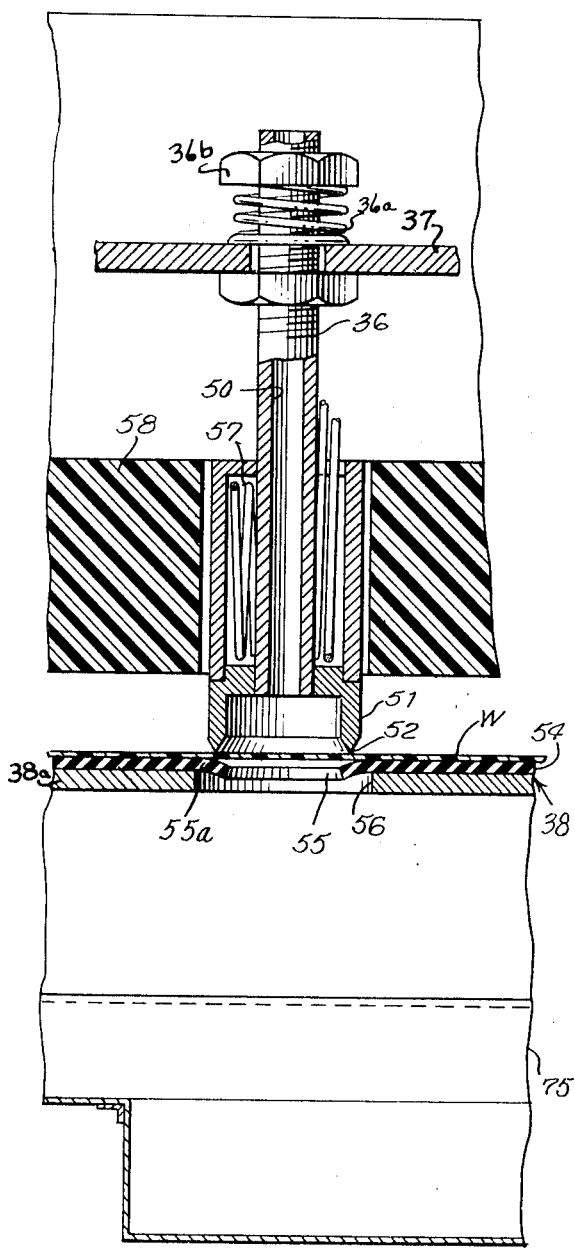
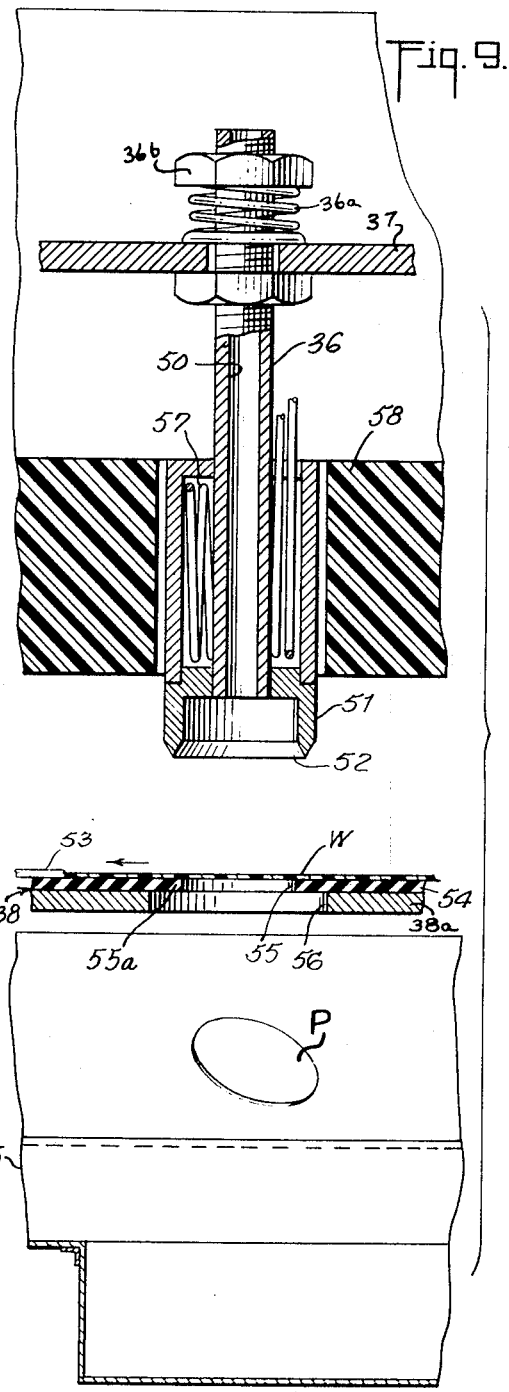
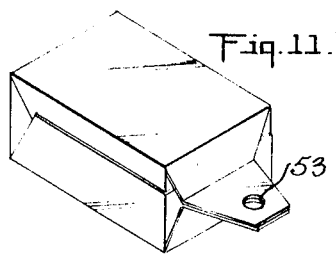
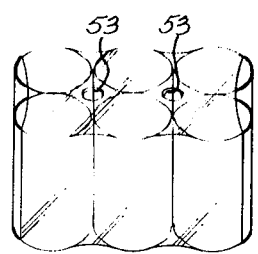
INVENTOR
ANDREW W. ANDERSON
BY Luther W. Hawley
ATTORNEY

APPARATUS FOR PUNCHING HOLES IN HEAT SHRINKABLE WEB MATERIAL

BACKGROUND OF THE INVENTION

It is known in the prior art to heat shrink thermoplastic material around an article or a plurality of articles as shown in U.S. Pat. Nos. 3,092,439 and 3,503,097. In addition, it is shown to be known to form holes in such heat shrinkable material. However, certain disadvantages associated with the apparatus and methods of the prior art have been found to be present.

This invention relates to the problem of forming holes in a film, web, sheet or wrap of material such as polypropylene used in wrapping packages. The holes are provided to enable the stamping of a revenue stamp on the article that has been wrapped in a material such as polypropylene. The holes might also give access to the packages which have been wrapped in the polypropylene for other uses.

SUMMARY OF THE INVENTION

The method of the invention comprises the step of feeding a web of the material such as polypropylene between a support member and a heated punch. The heated punch is thrust through the web of material to form a hole therein. The heated punch raises the temperature of the web material along the periphery of the hole and a thickened ridge is formed therearound. The apparatus for punching the holes in this web of material comprises a punching mechanism including a base support and at least one punch member disposed above the base support. The apparatus also includes means for heating the punch member and means lowering the punch member to form a hole in the web when it is fed between the base support and the punch member. Various specific embodiments of the apparatus set forth further features of the invention.

The primary object of this invention is to provide a wrapper having holes that are reinforced to prevent tearing of the material therearound.

BRIEF DESCRIPTION OF DRAWINGS

Other objects of this invention will appear in the following description and appended claims, reference being made to the accompanying drawings forming a part of the specification wherein like reference characters designate corresponding parts in the several views.

FIG. 1 is a front elevation of an apparatus constructed in accordance with the invention;

FIG. 2 is a plan view of the apparatus shown in FIG. 1;

FIG. 3 is a sectional elevation taken substantially on line 3—3 of FIG. 1, looking in the direction of the arrows;

FIG. 4 is a plan view of the punched sheet;

FIG. 4A is an enlarged sectional elevation taken on line 4A—4A of FIG. 4, looking in the direction of the arrows;

FIG. 5 is a perspective elevation of a package having holes punched therethrough;

FIG. 5A is a perspective elevation of a package wrapped by the sheet having holes therein;

FIG. 6 is a plan view of the base, above which the punches are mounted, taken substantially on line 6—6 of FIG. 3, looking in the direction of the arrows;

FIG. 7 is a sectional elevation taken substantially on line 7—7 of FIG. 6, looking in the direction of the arrows;

FIG. 8 is an enlarged sectional elevation taken substantially on line 8—8 of FIG. 2, looking in the direction of the arrows, showing in section, one of the punch units in punching position;

FIG. 9 is a view similar to FIG. 8 but showing the punch in elevated position.

FIG. 10 is a perspective view showing another use of the holes as finger holes for carrying a package; and FIG. 11 is a perspective view showing a hole used for carrying a package.

DESCRIPTION OF SPECIFIC EMBODIMENT

More specifically, an apparatus made in accordance with this invention includes a punch unit 34 which is slidable vertically on rods 35. Punch members 36 are mounted on plates 37 and are raised and lowered in a manner hereinafter described to punch holes through a web W which is fed between the punch members 36 and base support 38. The punch unit or frame 34 and the movements thereof are shown particularly in FIG. 1 and FIG. 3. The base support 38 and its movements are shown in FIGS. 1, 3, 6 and 7.

Referring to FIG. 3, the operating means for raising and lowering connections for the punch unit 34 include the main drive shaft 40 which is driven by a chain 41 and a sprocket 42. The sprocket 43 is mounted on shaft 40 and is laterally displaced with respect to sprocket 42. A chain 44 is located on the sprocket 43 and drives the sprocket 45 mounted on a shaft 46. A cam 47 is mounted on the shaft 46 and engages a cam follower 48 that is mounted on a plate 49. The plate 49 is connected to the punch unit 34 which is slidably mounted on rods 35 as discussed hereinabove. As the cam 47 turns, the punch unit 34 is raised and lowered through the action of the cam follower 48 mounted on the plate 49. The plate 37 which carries the punch members 36 is fixedly attached to the punch unit 34. Therefore, as the punch unit 34 is raised and lowered, the punch members 36 are also raised and lowered.

The punching mechanism is shown in FIGS. 8 and 9. The punch members 36 include a hollow passage 50 extending through the punch post (not numbered) and the punch base 51. In this specific embodiment, the punch base 51 is cylindrical and therefore provides a circular hole when thrust through the web W of material. The punch member 36 also includes a V-shaped cutting edge 52 which cuts the openings 53 in the web W which is disposed between the base support 38 and the punch member 36. That is, the punch base 51 has a closed configuration with the cutting edge 52 to completely remove a punching from the web W. A resilient sheet 54 of a material such as rubber is stretched over the top plate 38a located on the base support 38. Both the flexible sheet 54 and base support 38 have openings 55 and 56 respectively located below the lower ends of the punch members 36. As shown in the drawings, the sheet 54 and base support 38 constitute a flexible base portion that is contiguous to a rigid base portion. The openings 55 located in the flexible sheet 54 are registered with the openings 56 located in the rigid base portion. As shown, the flexible base openings 55 are smaller than the rigid base openings 56 thereby forming a flexible overhanging portion 55a along the edge of the ridge base openings 56.

The punch members 36 are heated by a heating coil 57 that is surrounded by insulation 58. When the heated punch members 36 perforate the web W and punch holes therein, a rib 59 as shown in FIG. 4A is formed at the periphery of the hole 53. That is, when the heated punch member 36 is thrust against the flexible base portion 55a, a punching is removed and heat is provided substantially simultaneously along the periphery of the hole defined by the missing punching. The thickened ridge or rib 59 strengthens the material of the web W and prevents tearing at the holes 53 formed therein. The heating means and the punch members 36 are integrally constructed in this specific embodiment.

As shown in FIGS. 1 and 6, the base support 38 includes pins 60 and spring 61 located at each corner thereof to hold the top plate 38a to the base support 38. The top plate 38a is tightly held to the base support 38 except when it is raised by cams 62 which are mounted on shafts 63. The chain and sprocket connections 64 drive the shafts 63 from the drive shaft 46.

The transverse feed for the web W that is formed of polypropylene in this specific embodiment is shown particularly in FIGS. 1 and 2. The web W is led around an idler roller 65 and around a roller 66 mounted in a slide roller unit 67. From the roller 66, the web W passes over the top of the base support 38 and below the punch unit 34. The web W is subsequently led around a roller 68 which is mounted in the other end of the roller bar unit 67. The other ends of the rollers 66 and 68 are mounted in a bar 69. A crank arm 70 is connected to the bar 69 and is driven by a crank 71 mounted on the drive shaft 40. In this manner, the sliding frame unit and the rollers 66 and 68 are actuated to move the web W beneath the punch frame unit 34. The punch members 36 are operated from the position shown in FIG. 9 to the position shown in FIG. 8 to punch holes 53 in the web W.

The carriage frame motion by crank is neutralized by the motion of the web W around the rollers and provides a momentary dwell during which the punch members 36 operate to punch the holes 53.

A further feature of the invention includes a vacuum forming means located below the base support 38 to remove punchings P from the apparatus. The vacuum forming means in this specific embodiment includes a vacuum chamber 75 mounted on the bottom of the base support 38. The punchings P are sucked into the vacuum chamber 75 through the holes 55 and 56 and are subsequently discharged from the apparatus. The vacuum formed within the chamber 75 is broken when the cams 62 raise the top plate 38a of the base support 38. It will be noted that in FIGS. 8 and 9, the punch members 36 are encircled by springs 36a located at the upper ends of the punch members 36 above the plate 37. The springs 36a are held between nuts 36b and the top of the plate 37. The punch members 36 may expand due to the heating from the heating coils 57. Expansion is permitted by the action of the springs 36a located above the plate 37.

In the manner above described, a web W is punched to form the openings 53 which are formed in such a manner to obtain thickened ridges or ribs 59 thereby strengthening the punched portions of the web W. The openings 53, thus reinforced by the strengthening ribs, may be used to give access to the contents of the packages to stamp price marks thereon or, as shown in FIGS. 10 and 11, for use in carrying the packages. As evidenced from the FIG. 10, the package comprises a plurality of at least six cylindrically shaped articles which are disposed in a juxtaposed relationship. A sheet of heat shrinkable material made in accordance with this invention has been wrapped around the plurality of articles. The sheet has two openings 53 which have been ridge reinforced in accordance with this invention. These particular openings are used for carrying the wrapped package. The heat shrinkable material which has been wrapped around the plurality of articles has been heat shrunk.

Another package is disclosed in FIG. 5a which comprises an article having the shape of a rectangular polygon. The sheet of heat shrinkable material having an opening from which a punching has been completely removed is wrapped around this article. The opening is registered with one side of the article. The opening has been made in accordance with this invention and therefore includes a thickened ridge along the entire periphery of the opening.

Another package showing a plurality of articles disposed in a juxtaposed arrangement is shown in FIG. 5. In this specific embodiment, each article is a rectangular polygon. A ridge reinforced opening is contiguous to and registered with one side of each of the articles. All of the ridge reinforced openings are on a common side of the wrapped package.

While the wrapper sheet with openings has been shown and described in detail, it is obvious that this invention is not to be considered as being limited to the exact form disclosed, and that changes in detail and construction may be made therein within the scope of the invention, without departing from the spirit thereof.

Having thus set forth and disclosed the nature of this invention, what is claimed is:

1. An apparatus for punching holes in a web of heat shrinkable material used in wrapping packages comprising:
   a. a punching mechanism including a base support means and at least one punch member mounted in cooperative relationship with the base support means,
   b. said base support means including a flexible base portion contiguous to a rigid base portion,
   c. said flexible base portion including openings that are registered with openings located in the rigid base portion,
   d. said flexible base openings being smaller than said rigid base openings so that the flexible base portion overhangs the edge of the rigid base openings,
   e. said punch member having a closed configuration with a cutting edge which acts against said flexible base portion to completely remove a punching from the web,
   f. said punching mechanism includes means for heating the punch member to effect formation of a rib structure along the periphery of the hole cut by the punch member,
   g. means for feeding the web of heat shrinkable material between the base support means and the punch member, and
   h. means for bringing the punch member against the flexible base portion to form a rib reinforced hole in the web.

2. An apparatus as defined in claim 1 wherein there is a plurality of punch members disposed in an ordered arrangement adjacent the base support.

3. An apparatus as defined in claim 1 wherein said punch member includes a hollow passage extending through a punch post and a punch base.

4. An apparatus as defined in claim 3 wherein said punch member and said heating means are integrally constructed.

5. An apparatus as defined in claim 1 wherein the web feeding means is reciprocatable across the base support means.

6. An apparatus as defined in claim 1 including a means to form a vacuum disposed adjacent the base support to remove the punchings which have been cut from the web.

7. An apparatus as defined in claim 6 wherein said vacuum forming means includes a vacuum chamber disposed on the side of the base support opposite from the punch member.

8. An apparatus as defined in claim 6 wherein the punch member is disposed above the base support means and the vacuum forming means is disposed below the base support means.

* * * * *